United States Patent
Lee et al.

(10) Patent No.: US 11,978,220 B2
(45) Date of Patent: May 7, 2024

(54) OBJECT TRACKING WITH FEATURE DESCRIPTORS

(71) Applicant: ObjectVideo Labs, LLC, Tysons, VA (US)

(72) Inventors: Sung Chun Lee, Tysons, VA (US); Gang Qian, McLean, VA (US); Sima Taheri, McLean, VA (US); Sravanthi Bondugula, Tysons, VA (US); Narayanan Ramanathan, Chantilly, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 119 days.

(21) Appl. No.: 17/349,342

(22) Filed: Jun. 16, 2021

(65) Prior Publication Data

US 2021/0406547 A1 Dec. 30, 2021

Related U.S. Application Data

(60) Provisional application No. 63/044,439, filed on Jun. 26, 2020.

(51) Int. Cl.
*G06T 7/20* (2017.01)
*G06T 7/246* (2017.01)
(Continued)

(52) U.S. Cl.
CPC .............. *G06T 7/246* (2017.01); *G06T 7/60* (2013.01); *G06T 7/73* (2017.01); *G06V 10/56* (2022.01);
(Continued)

(58) Field of Classification Search
CPC ........ G06V 20/40; G06V 10/22; G06V 10/56; G06V 20/52; G06V 10/761; G06T 7/60;
(Continued)

(56) References Cited

U.S. PATENT DOCUMENTS

2020/0033930 A1 * 1/2020 Belagal Math .......... G09G 3/20
2020/0334857 A1 * 10/2020 Garud ...................... G06T 7/75

FOREIGN PATENT DOCUMENTS

| CN | 106504262 | * | 3/2017 |
| CN | 108446613 | * | 3/2018 |
| WO | WO 2019/118089 | * | 6/2019 |

OTHER PUBLICATIONS

Ojha et al., "Image Processing Techniques for Object Tracking in Video Surveillance—A Survey", 2015 International Conference on Pervasive Computing (ICPC) (Year: 2015).*

(Continued)

*Primary Examiner* — Qian Yang
(74) *Attorney, Agent, or Firm* — Fish & Richardson P.C.

(57) ABSTRACT

Methods, systems, and apparatus, including computer programs encoded on computer storage media, for using feature descriptors to track objects depicted in images. One of the methods includes receiving hue, saturation, value data for an image and data that indicates an object detected in the image, generating a feature descriptor that includes hue data and saturation data, determining, for each of two or more tracked objects that each have a historical feature descriptor (Continued)

that includes historical hue data and historical saturation data, a distance between (i) the respective historical feature descriptor and (ii) the feature descriptor, associating the feature descriptor for the object with a tracked object from the two or more tracked objects, and tracking the tracked object in one or more images from a video sequence using the feature descriptor and the historical feature descriptor.

20 Claims, 4 Drawing Sheets

(51) Int. Cl.
  *G06T 7/60* (2017.01)
  *G06T 7/73* (2017.01)
  *G06V 10/56* (2022.01)
  *G06V 10/74* (2022.01)
  *G06V 20/40* (2022.01)
  *G06V 20/52* (2022.01)
(52) U.S. Cl.
  CPC ............ *G06V 10/761* (2022.01); *G06V 20/40* (2022.01); *G06V 20/52* (2022.01)
(58) Field of Classification Search
  CPC . G06T 7/73; G06T 2207/30232; G06T 7/246; G06T 2207/30196
  See application file for complete search history.

(56) References Cited

OTHER PUBLICATIONS

Machine translation for CN 108446613 (Year: 2018).*
Lee et al., "Visual Tracking Using Pertinent Patch Selection and Masking", Proceedings of the IEEE Conference on Computer Vision and Pattern Recognition (CVPR), 2014, pp. 3486-3493 (Year: 2014).*
Machine translation for CN 106504262 (Year: 2017).*
Ester et al., "A Density-Based Algorithm for Discovering Clusters in Large Spatial Databases with Noise," 2nd International Conference on Knowledge Discovery and Data Mining, Jun. 6, 2010, 6 pages.
Kalal et al., "Forward-Backward Error: Automatic Detection of Tracking Failures," International Conference on Pattern Recognition, Aug. 23-26, 2010, 4 pages.
Liao et al., "Modeling Pixel Process with Scale Invariant Local Patterns for Background Subtraction in Complex Scenes," Center for Biometrics and Security Research & National Laboratory of Pattern Recognition, Institute of Automation, Chinese Academy of Sciences Machine Vision Group, University of Oulu, Finland, 2010, 6 pages.
Liao et al., "Person Re-identification by Local Maximal Occurrence Representation and Metric Learning," Center for Biometrics and Security Research, National Laboratory of Pattern Recognition Institute of Automation, Chinese Academy of Sciences, Jun. 7-12, 2015, 2197-2206.

* cited by examiner

OBJECT TRACKING WITH FEATURE DESCRIPTORS

CROSS-REFERENCE TO RELATED APPLICATION

This application claims the benefit of U.S. Provisional Application No. 63/044,439, filed on Jun. 26, 2020, the contents of which are incorporated by reference herein in its entirety.

BACKGROUND

Properties can be equipped with monitoring systems that include sensors and connected system components. Some residential-based monitoring systems include cameras.

SUMMARY

A system, e.g., a camera such as a doorbell camera, can track objects for video surveillance applications. The objects can be moving objects, depicted in a video sequence, such as people, animals, or vehicles. Based on the tracking, the system can perform an automated action, such as opening or unlocking a door, generating an alert, or performing another appropriate action.

The system can track multiple objects across multiple images, e.g., frames, in a video sequence. Tracking multiple objects across multiple images can be computationally intensive and use a lot of computing resources, e.g., specifically for specialized hardware such as a doorbell camera. This tracking can be limited when the system has limited resources, e.g., memory or power or both. For instance, when the system is implemented in a doorbell camera, the doorbell camera may have limited memory; limited power, e.g., based on the limitations of a processor included in the doorbell camera or when powered using battery power; or both.

To improve the system's efficiency, the system can use a reduced size feature descriptor, an optimized distance metric that compares feature descriptors for objects depicted in different images, or both. A feature descriptor can include data that represents features of an object depicted in an image, e.g., can be a feature vector. In some examples, to improve system accuracy, the system can use a higher quantity of bins for the data included in the feature descriptor.

For instance, the system can generate bounding boxes for objects detected in an image from the video sequence. For each of the detected objects, the system can generate an object mask that represents the objected surrounded by a corresponding bounding box. The system can use the object masks, the bounding boxes, or both, to create a feature descriptor for an object. The feature descriptor can include one or more feature vectors that include data, e.g., color data, for the object.

The system can determine multiple blocks of the bounding box, or the mask. The system can generate, for each of the blocks, a feature vector or a portion of a feature vector for each row in the block. The feature vector can include an entry for each of multiple data range bins, each of multiple columns, or both. When the feature vector includes data for hue and saturation, the bins can be bins for hue and saturation data. For instance, the system can have 30 hue and 48 saturation bins, an image size of 48 by 128, e.g., pixels, a block size of 30 by 30, e.g., pixels, and a block step of 15, e.g., pixels. With a block size of 30 by 30, the system can generate multiple image blocks for an image in a two by seven grid, e.g., 2=(48−(30−15))/15 by 7=(128−(30−15))/15 when rounding down.

In this example, the grid includes seven horizontal image strips, e.g., rows, for the height of 128, and each horizontal image strip consists of two image blocks, e.g., across the width, for the width of 48. The system can compute a feature vector, e.g., a maximum hue and saturation color histogram, for each horizontal image strip by combining data for the two image blocks in a single horizontal image strip. As a result, the system can generate seven feature vectors for image feature, e.g., one for each horizontal image strip. Each feature vector, e.g., each hue and saturation color histogram vector, can have a length of 1440 based on the 30 hue bins and the 48 saturation bins, e.g., 1440=30×48. Each value in the vector can be a maximum value for the corresponding bin range. Because the system processes data for seven horizontal image strips, with one feature vector of length 1440 for each strip, the image can be represented by 10080 feature values, e.g., 1440×7=10080. These values can be in a single feature vector, e.g., made from concatenating seven feature vectors, one for each of the horizontal image strips.

In the above example with seven horizontal image strips and two image blocks in each strip, the system can have excess pixels, e.g., an extra three pixels in the horizontal direction, an extra eight pixels in the vertical direction, or both. The system can skip analysis of these pixels, analyze these pixels with an adjacent image block, or perform some other appropriate analysis. For instance, the system can use a block step of 18 in the horizontal direction, a block step of 16 in the vertical direction, an image block size of 32 by 32, use image blocks of 33 by 30 for one of the vertical columns, use image blocks of 30 by 38 for one of the horizontal strips, use an image block of 33 by 38, e.g., for a corner image block, or some combination of two or more of these.

The system can include hue and saturation data in the feature vector, and not value data, e.g., brightness data, to account for illumination changes between images in the video sequence. In some examples, the system can reduce computer memory storage requirements by including hue and saturation data and not value data.

The system can repeat this process for each of the blocks of the bounding box. The blocks can be overlapping, non-overlapping, or a combination of both, e.g., in which some are overlapping and others are not.

The system can use all of the generated feature vectors, or the portions of generated feature vectors, as a feature descriptor for the object. For instance, when the system generates a portion of a feature vector for each row in a block, the system can concatenate the portions together to generate a single feature vector, as a feature descriptor, for the object.

To determine whether an object depicted in a subsequent image is likely the same object as a previously detected object depicted in a prior image, the system can compute a distance between the feature descriptors for the objects. For instance, the system can use one or more vector computations to determine a distance between the objects, as discussed in more detail below. The distance can indicate a likelihood that the two objects are the same object. For example, a shorter distance can indicate a higher likelihood that the two objects are the same object and a longer distance can indicate a lower likelihood that the two objects are the same object.

To improve the distance computation, the system can use Quadratic Discriminant Analysis ("QDA"). The system need not apply QDA on the high dimensional vector space, which 10080. The system can first reduce the vector space by projecting the high dimensional vectors into the QR decomposed space. The QR decomposition is a decomposition of a matrix into a product. For example, a matrix A=QR where Q is an orthogonal matrix and R is an upper triangular matrix. If A has n linearly independent columns, then the first n columns of Q form an orthogonal basis for the column space of A. During a kernel learning process, the matrix "A" can be generated by stacking all training input feature vectors. For example, if there are "k" number of feature vectors that are used for the kernel training process, the dimension of the matrix "A" is 10080×k.

After the QR decomposition of the matrix A, the system can obtain a projection matrix, "W", from the first n columns of Q. The system can determine the number "n" as the number of the column basis whose eigenvalue is higher or equal to 1.0.

As described in more detail below, the system can reduce the original vector space into the smaller, e.g., more manageable, vector space by using the learnt kernel W. The system applies the Mahalanobis distance kernel, "M", to compute the distance between a feature vector and a distribution of feature vectors. The system obtains the Mahalanobis distance matrix kernel, "M" during the kernel learning process. The system can learn the kernel matrix "M" by computing posteriori class probabilities which are treated as similarity measures, whether a pair of images depicts the same object. The system can then calculate a Mahalanobis distance using the learnt metric kernel M, which reflects a distribution variance of vectors when computing the Mahalanobis distance.

The system can further decompose the metric kernel M using a Cholesky decomposition as $L*L^H$. The system can compute a new kernel matrix D by multiplying W and L during the kernel learning process, and use D to project the original feature vectors so that the distance between the projected feature vectors is now computed by the Euclidean distance which is much faster than the Mahalanobis distance computation.

In general, one innovative aspect of the subject matter described in this specification relates to feature descriptors used to track objects depicted in images, and can be embodied in methods that include the actions of receiving hue, saturation, value data for an image and data that indicates an object detected in the image; generating, for the object, a feature descriptor that includes hue data and saturation data from the hue, saturation, value data for the image; determining, for each of two or more tracked objects that each have a historical feature descriptor that includes historical hue data and historical saturation data, a distance between (i) the respective historical feature descriptor that includes the historical hue data and the historical saturation data for the tracked object and (ii) the feature descriptor that includes the hue data and the saturation data for the object; associating the feature descriptor for the object with a tracked object from the two or more tracked objects whose distance between the respective historical feature descriptor and the feature descriptor satisfies a threshold distance; and tracking the tracked object in one or more images from a video sequence using the feature descriptor and the historical feature descriptor.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
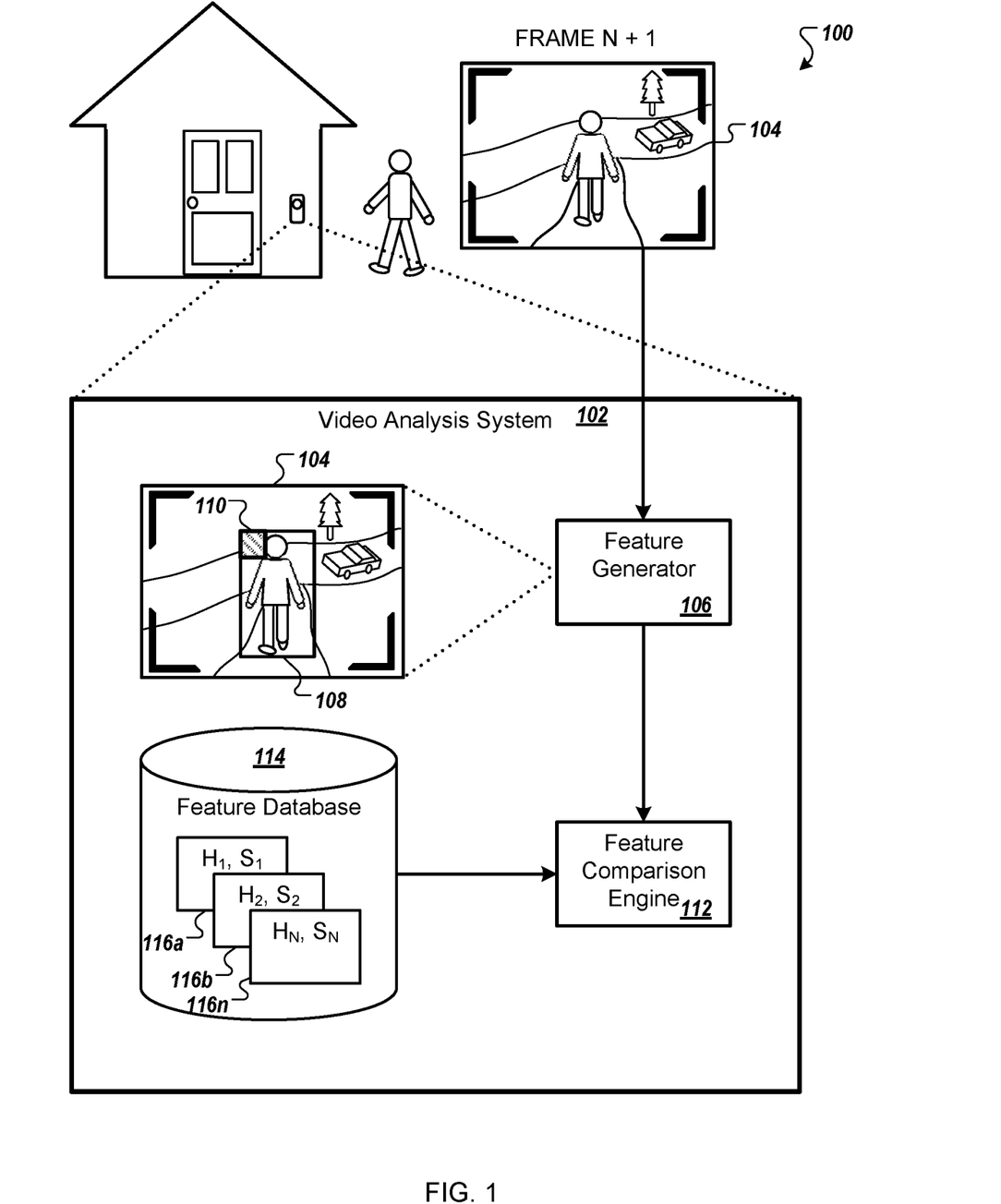
FIG. 1 depicts an example environment that includes a video analysis system that uses feature descriptors to track objects depicted in images.

FIG. 1 depicts an example environment 100 that includes a video analysis system 102 that uses feature descriptors to track objects depicted in images. The video analysis system 102 receives an image 104 from a camera. The video analysis system 102 can be the camera that captures the images, e.g., can be implemented on the camera, or communicate with the camera, e.g., using a network.

When the video analysis system 102 analyzes images from a video sequence, the image 104 can be an N+1th image, e.g., when the video analysis system 102 includes data for N images in a feature database 114. The images can be frames in a video sequence. For instance, the video analysis system 102 can process data for multiple, e.g., N, images. The video analysis system 102 can generate feature descriptors 116a-n for one or more of the N images and store the feature descriptors 116a-n in the feature database 114.

When the video analysis system 102 receives image data for the N+1th image 104, the video analysis system 102 can process the image data. The image data can be any appropriate type of image data, such as hue, saturation, and value data for an image.

A feature generator 106 in the video analysis system 102 can process the image data to generate a feature descriptor for an object depicted in the N+1th image 104. For example, the feature generator 106, or another component in the video analysis system 102, can detect an object depicted in the N+1th image 104. The feature generator 106 can generate a bounding box 108 that surrounds the detected object. The bounding box can be a box that surrounds the detected object as closely as possible, e.g., be the smallest box that complete surrounds the detected object.

The feature generator 106 can use data for the bounding box 108 to generate a feature descriptor for the detected object. For instance, the feature generate can analyze one or more blocks 110 of the N+1th image 104 that are included in the bounding box 108 to generate a feature vector, as an example feature descriptor, for the detected object.

Figure 2:
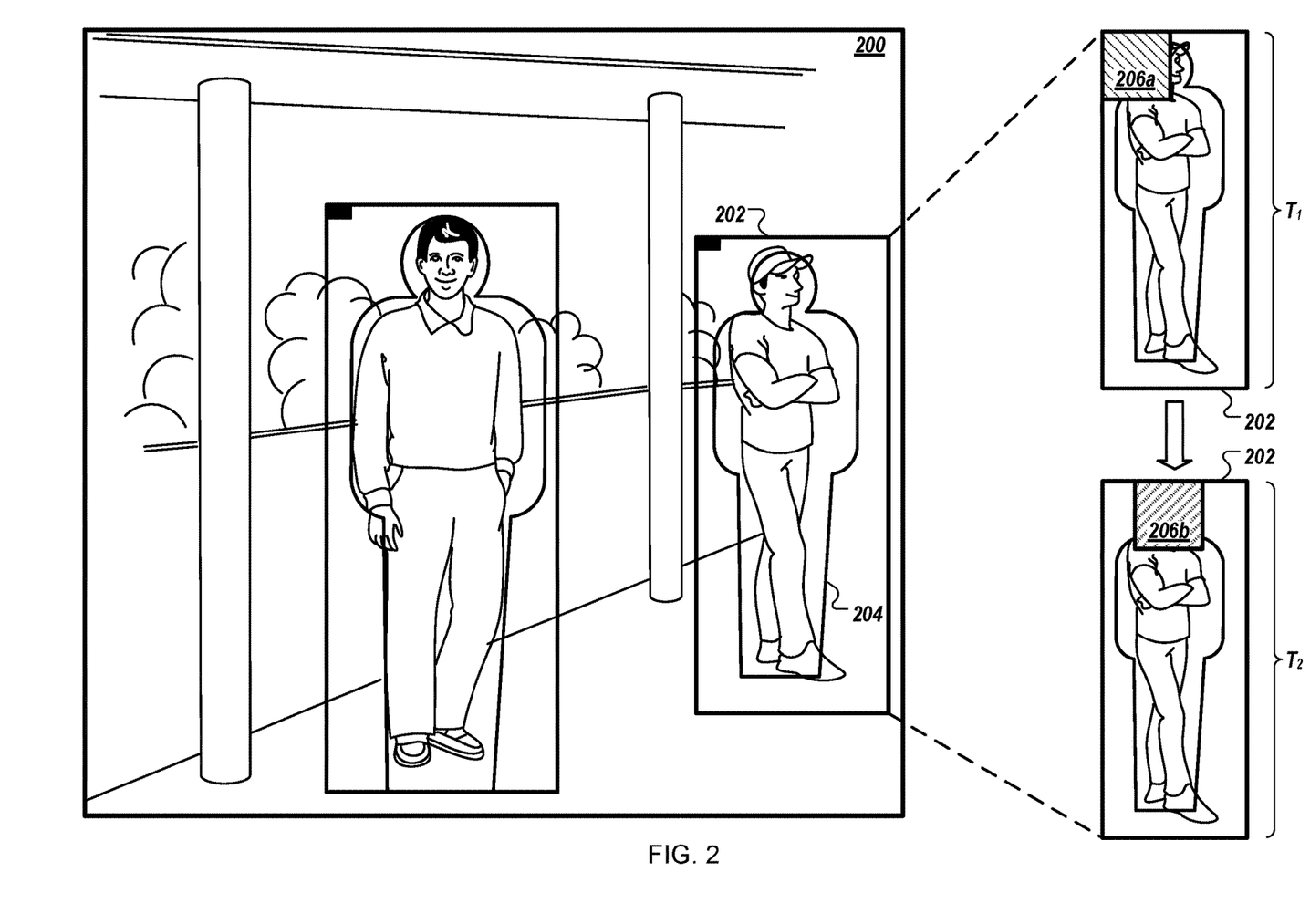
FIG. 2 depicts an example image with a bounding box.

FIG. 2 depicts an example image 200 with a bounding box 202. The feature generator 106 can process the example image 200, e.g., as the N+1th image 104, using the bounding box 202, e.g., as the bounding box 108.

For example, the feature generator 106 can process data for multiple blocks 206a-b of the mask 204. The blocks can have any appropriate size, shape, or both. For instance, when the bounding box is 48 by 128 pixels, the feature generator 106 can process blocks 206a-b that are 30 by 30 pixels.

The blocks 206a-b can be overlapping, or non-overlapping. For example, the feature generator 106 can process the blocks 206a-b that overlap by 50%, e.g., 15 pixels. The blocks 206a-b can overlap in a horizontal direction, a vertical direction or both. For instance, the feature generator 106 can process blocks that are overlapping in both the horizontal and the first direction. In this example, during time period $T_1$, the feature generator 106 processes data for a first block 206a in a first row of the bounding box 202. During time period T2, the feature generator 106 processes data for a second block 206b in the first row. The feature generator 106 then proceeds to process data for any remaining blocks in the first row.

The feature generator 106 can process data for a second row in the bounding box 202 that is below, and overlapping with, the first row. The feature generator 106 can process data for the second row after, or concurrently with, the then process data for a second column in the bounding box 202, and so on.

In some examples, the feature generator 106 processes data for an object mask 204 that surrounds an object in a bounding box 202. For instance, the feature generator 106 can process data for blocks 206a-b for the object mask 204 instead of processing all data for the bounding box 202.

When the feature generator 106 processes data for a block 206a-b, the feature generator 106 can determine feature data for the corresponding block 206a-b. For example, the feature generator 106 can determine feature data that represents the block 206a-b. The feature data can include a feature vector or part of a feature vector. For instance, the feature generator 106 can generate, as a feature descriptor for an object, one or more feature vectors for the object. When generating multiple feature vectors, the feature generator 106 can generate one feature vector for each row of blocks 206a-b. In some examples, the feature generator 106 can generate a matrix as the feature descriptor.

In some implementations, the feature generator 106 can use a process based on the pseudo code in Table 1, below, to generate the feature descriptor. For example, the system can have 30 hue and 48 saturation bins, represented by a bin_size of [30, 48]. The system can use an image size of 48 by 128, e.g., pixels, such that the image_height is 128 and the image_width is 48. The system can use a block_size of 30, e.g., 30×30 pixels, and a block_step of 15, e.g., pixels

TABLE 1

Example feature extraction pseudo code

```
// receive input image
input image : (48x128)
// determine a total number of rows
row_num = (image_height − (block_size − block_step)) / block_step
// determine a total number of columns
col_num = (image_width − (block_size − block_step)) / block_step
for row in range(row_num):
    for col in range(col_num):
        // determine an image block for the current row and column
        img_block = copy_image_by_30_x_30_with_15_overlapping_steps
        // determine a histogram for the image block
        compute histogram as hs_hist for img_block (bin_size:[30, 48])
        // if the system is analyzing data for the first column in the row, set the
feature data as the histogram
        if col == 0:
            hs_feat_col = hs_hist
        // if the system is analyzing another column in the row, use the maximum
values from the histogram and prior feature data for updated feature data
        else:
            hs_feat_col = max(hs_feat_col, hs_hist)
        // add data for the just processed column to a feature vector for the input image
        hs_feat = concatenate([hs_feat, hs_feat_col], 0)
// normalize the values in the feature vector
normalize hs_feat
// generate and return the feature vector as the feature descriptor
feature_descriptor = concatenate([hs_feat], 0)
return feature_descriptor
``` processing of data for the first row. For instance, when the feature generator 106 has parallel processing functionality, the feature generator 106 can process data for a first block in a first row substantially concurrently with processing data for a first block in a second row.

In some examples, the feature generator 106 can process data for columns of the bounding box 202. For instance, the feature generator 106 can process data for a first block 206a in a first column, then a second block in the first column. The feature generator 106 can continue this process until the feature generator 106 has processed data for each of the blocks in the first column. The feature generator 106 can In some implementations, the feature generator 106 uses only a subset of the image data for the image 200 to generate the feature descriptor. For instance, the feature generator can include hue and saturation data for the image 200 in the feature descriptor without including any value data for the image 200 in the feature descriptor.

In some implementations, the feature generator 106 uses only a single input image, e.g., bounding box, size. Use of only a single input image size can reduce processor cycles used by the feature generator 106 to generate a feature descriptor because the feature generator 106 does not need to determine an image size, a size of an object surrounded by a bounding box, or both.

In some implementations, the feature generator 106 can analyze data for every image, e.g., frame, in a video sequence. In these implementations, the feature generator 106, or another component, can generate a bounding box for some of the images, e.g., to reduce memory, and processor use. For example, the feature generator 106 or another component can generate a bounding box for every fifth image. The video analysis system 102 can select the period for which to generate bounding boxes, e.g., every $X^{th}$ image, by balancing computer resource savings with system accuracy. For instance, the video analysis system 102 can have a higher accuracy when generating a bounding box more frequently, e.g., for a smaller X, but also have a higher computer resource use, e.g., use more memory and processor cycles.

Returning to FIG. 1, the feature generator 106 provides the feature descriptor for the object to a feature comparison engine 112 included in the video analysis system 102. In some examples, the feature generator 106 stores the feature descriptor in the feature database 114, or another memory, and the feature comparison engine 112 retrieves the feature descriptor.

The feature comparison engine 112 compares the feature descriptor for the bounding box 108 with one or more feature descriptors 116a-n for previously detected objects. For instance, the feature comparison engine 112 can compare the feature descriptor for the bounding box 108 with N feature descriptors 116a-n for N objects that were detected in prior images from the video sequence. The prior images can be a predetermined quantity of prior images, images captured within a predetermined period of time of the capture of the image 104, or some other set of images from the video sequence.

The feature comparison engine 112 can determine a distance between the feature descriptor for the bounding box 108 and some of the feature descriptors 116a-n for previously detected objects. The feature comparison engine 112 can determine which distance indicates a highest likelihood that the bounding box 108 surrounds the same object as one of the previously detected objects. The feature comparison engine 112 can determine that the feature descriptor for the previously detected object with the shortest distance has the highest likelihood of being the same object as the object surrounded by the bounding box 108.

The feature comparison engine 112 can use Quadratic Discriminant Analysis ("QDA") to determine the distance between two feature descriptors, e.g., between two feature vectors. For instance, the feature comparison engine 112, or another system such as a training system, can determine a decomposition D to combine with each of the two feature descriptors, separately.

During image analysis, the feature comparison engine can then combine the decomposition with the feature descriptor for the bounding box 108 and a feature descriptor for a previously detected object to determine two combined values. The feature comparison engine 112 can then compare the combined values for the two feature descriptors to determine a distance between the two combined values. For instance, when the feature descriptors are feature vectors, the feature comparison engine 112 can determine a distance between the two feature vectors in a multidimensional space. The distance can indicate a likelihood that an object surrounded by the bounding box 108 is likely the same object as that represented by the feature descriptor for the previously detected object.

The training system can determine the decomposition $D \in R^{d \times r}$ using a vector space kernel $W \in R^{1 \times d}$ and a distance metric kernel $M \in R^{r \times r}$, for r<d when d is the dimension for the original vector space and r is a dimensional subspace for a cross-view similarity measure. The vector space kernel W can reduce the vector space. The training system can have a large training data set, e.g., 303,158 images. The training system can use, for objects depicted in the training data set, feature descriptors g, p.

During runtime, one of the feature descriptors can be for a "previously" detected object, e.g., the feature descriptor p. One of the feature descriptors can be for a "newly" detected object, e.g., the feature descriptor g. However, during training, the training system need not distinguish between previously and newly detected objects.

The system, e.g., a kernel learning system can compute the projection kernel matrix, W using the training data during the kernel learning process, e.g., as described above. After training, the system can use equations (1) and (2), below, to project feature vectors, p and q, into a reduced size vector space. Using this projection, the system can determine the reduced size feature vectors, p', and q', respectively for the feature vectors p and q.

$$g \times W = (1 \times 10080) \times (10080 \times 52) = g'(1 \times 52) \quad (1)$$

$$p \times W = (1 \times 10080) \times (10080 \times 52) = p'(1 \times 52) \quad (2)$$

The system can compute a Mahalanobis Distance between g and p using equation (3), below, that includes a Mahalanobis distance kernel M, as described above. In some examples, the system can compute the Mahalanobis distance once for each pair of bounding boxes 108.

$$g' \times M \times p'^T = (1 \times 52) \times (52 \times 52) \times (52 \times 1) = \text{distance value}(1 \times 1) \quad (3)$$

To improve a speed of a computation of a distance between the two feature vectors, p and q, the system can use a decomposition D and compute a Euclidean distance rather than computing a Mahalanobis distance. The system can decompose M using a Cholesky decomposition to determine the decomposition D. For instance, the system can use equations (4) and (5), below, to determine the decomposition D for M, a positive definite.

$$M = L^* L^H \quad (4)$$

$$W \times L = D \quad (5)$$

The system, e.g., the kernel learning system, can then determine the distance d between the two feature descriptors as d=|g"−p"| using the decomposition D. The system can determine the distance d=|g"−p"| as a Euclidean distance. The system can determine g" and p" using equations (6) and (7), below, and then determine the distance d using g" and p".

$$g \times D = (1 \times 10080) \times (10080 \times 52) = g''(1 \times 52) \quad (6)$$

$$p \times D = (1 \times 10080) \times (10080 \times 52) = p''(1 \times 52) \quad (7)$$

The system, e.g., the kernel learning system, can then provide the decomposition D to the video analysis system 102 for use during runtime. For instance, the system can compute the decomposition D prior to installation of the video analysis system 102 on a camera, e.g., a doorbell camera. During setup of the doorbell camera, an installation system can install the video analysis system 102, with multiple parameters, onto the camera. As one of the parameters, the installation system can include the decomposition D for use by the feature comparison engine 112 during runtime analysis of images, e.g., objects depicted in images.

When the feature comparison engine 112 computes the distance d during runtime with the decomposition D, the feature comparison engine 112 can use equations (6) and (7) above to determine the distance between two feature descriptors g, p. Using this process, the feature comparison engine 112 can use fewer processor cycles, less memory, or both, compared to a matrix computation of the distance. For instance, since the feature comparison engine 112 does not use the vector space kernel W, the distance metric kernel M, or both, the feature comparison engine 112 can use fewer computing resources, e.g., processor cycles or memory or both, compared to other systems that determine the distance using a matrix computation.

When the feature comparison engine 112 performs multiple matrix computations, using both the vector space kernel W and the distance metric kernel M, the multiple matrix computations can require more processor cycles than computation with a single decomposition matrix D. In part, the former requires four computations (of g', p', p'$^T$, and the distance value), while the latter requires only three computations (of g", p", and a Euclidean distance). Further, the multiple matrix computations with the vector space kernel W and the distance metric kernel M can require more memory space for the computations than the computation with the single decomposition matrix D.

In some implementations, when the feature generator 106 generates the feature descriptor, e.g., feature vector, for a bounding box, e.g., the bounding box 108, the feature the feature descriptor can have smaller dimensions compared to dimensions for prior systems. For instance, some prior systems can have 26,960 values for a feature vector while the feature generator 106 can create a feature vector with only 10,080 values. Having a smaller dimension can save computer memory requirements, e.g., for the feature database 114 or other storage of a feature descriptor. Table 2 below provides an example comparison of a prior system to the video analysis system 102.

TABLE 2

Feature vector comparison: a prior system and the video analysis system

| | Feature Vector Size | Computation Time (millisecond) | Accuracy |
|---|---|---|---|
| Prior system | 26,960 | 116.2 | 90.29% |
| Video Analysis System | 10,080 | 0.7 | 89.67% |

Table 3 below provides an example of processing times for the video analysis system 102, with and without use of the decomposition D. In the example that is the basis of Table 3, a video analysis system, during runtime, processed images for five object trajectories and three newly identified bounding boxes. Each of the object trajectories included data for fifty bounding boxes, e.g., each of which were for a corresponding image in a video sequence.

For instance, the five object trajectories were for five people for which the feature database 114 included feature vectors. The three newly identified bounding boxes were bounding boxes for the image 104, e.g., the bounding box 108 and two other bounding boxes for the same image 104. Each of the newly identified bounding boxes was for a human depicted in the image 104.

TABLE 3

Distance calculation comparison: matrix multiplication and decomposition

| | Process using the kernels W and M | Process using the decomposition D |
|---|---|---|
| Feature Size to save | 10080 | 52 |
| Descriptor Computation Time (ms) | 0.7 | 0.7 |
| Projection Time (ms) | 0.45 | 0.35 |
| Distance Computation Time (ms) | 0.0613 | 0.0014 |
| Total Computation Time per Frame (ms) | 161.895 | 4.2 |

The video analysis system 102 is an example of a system implemented as computer programs on one or more computers in one or more locations, in which the systems, components, and techniques described in this document are implemented. The video analysis system 102 can be a camera or can be implemented on a camera. When the video analysis system 102 is separate from a camera that captures the image 104, the video analysis system 102 can communicate with the camera using a network, such as a local area network (LAN), wide area network (WAN), the Internet, or a combination thereof. In these examples, video analysis system 102 may use a single server computer or multiple server computers operating in conjunction with one another, including, for example, a set of remote computers deployed as a cloud computing service.

The video analysis system 102 can include several different functional components, including the feature generator 106, the feature comparison engine 112, and the feature database 114. The feature generator 106, the feature comparison engine 112, the feature database 114, or a combination of these, can include one or more data processing apparatuses. For instance, each of the feature generator 106, the feature comparison engine 112, and the feature database 114 can include one or more data processors and instructions that cause the one or more data processors to perform the operations discussed herein.

The various functional components of the video analysis system 102 may be installed on one or more computers as separate functional components or as different modules of a same functional component. For example, the feature generator 106, the feature comparison engine 112, and the feature database 114 can be implemented as computer programs installed on one or more computers, e.g., the video analysis system 102. The computer programs can be installed on one or more computers in one or more locations that are coupled to each through a network. In cloud-based systems for example, these components can be implemented by individual computing nodes of a distributed computing system.

Figure 3:
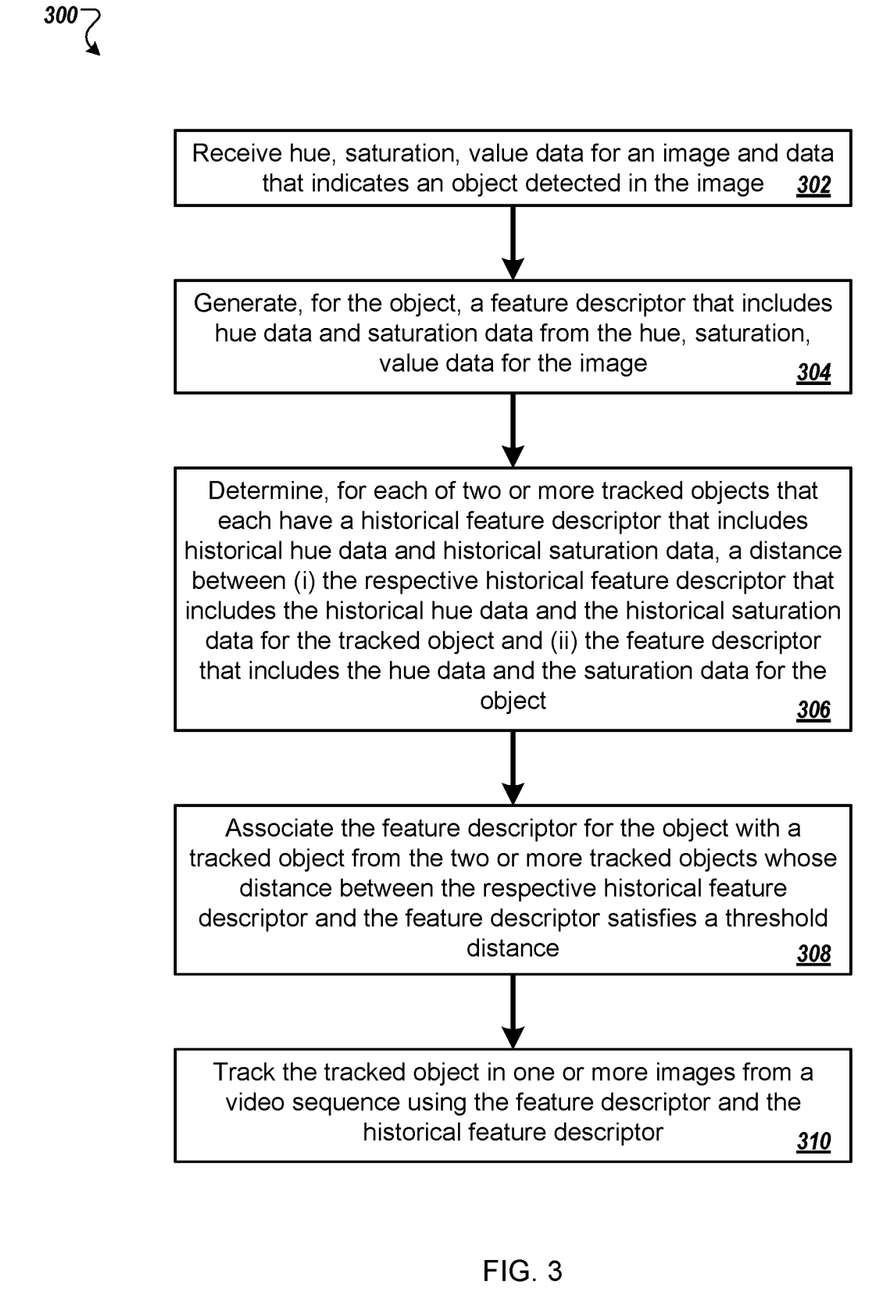
FIG. 3 is a flow diagram of a process for using feature descriptors to track objects depicted in images.

FIG. 3 is a flow diagram of a process 300 for using feature descriptors to track objects depicted in images. For example, the process 300 can be used by the video analysis system 102 from the environment 100.

A video analysis system receives hue, saturation, value data for an image and data that indicates an object detected in the image (302). For example, the video analysis system can receive color data for the image, e.g., the hue, saturation, value data, substantially with receipt of data that indicates the object detected in the image, e.g., bounding box data. In some examples, the video analysis system can receive the color data in a separate message from that by which the video analysis system receives the data that indicates the object detected in the image. The separate messages can be received in any appropriate order.

The data that indicates the object detected in the image can be any appropriate data. For instance, the data can represent a bounding box that defines a region in the image that surrounds an object depicted in the image. The data can represent an object mask for an object depicted in the image.

The video analysis system generates, for the object, a feature descriptor that includes hue data and saturation data from the hue, saturation, value data for the image (304). In some examples, the video analysis system generates, as the feature descriptor, a feature vector for the object.

The video analysis system can generate the feature descriptor using the hue and saturation data from the hue, saturation, value color data for the image. For instance, the video analysis system can generate the feature descriptor using only the hue and saturation data and without using the value data. The video analysis system can discard the value data, e.g., that represents lightness of the image. The video analysis system can determine to skip using the value data to generate the feature descriptor. Using the hue and saturation data, without the value data, for the feature descriptor, can make the video analysis system robust to illumination changes in images from a video sequence.

In some implementations, generating, for the object, a feature descriptor that includes hue data and saturation data from the hue, saturation, value data for the image includes storing, in the feature descriptor, a representation of the hue data and a representation of the saturation data without storing a representation of the value data in the feature descriptor. For example, the video analysis system may store, in a feature database, a feature descriptor that includes representations of the hue data and the saturation data but not a representation of the value data.

In some implementations, generating, for the object, a feature descriptor that includes hue data and saturation data from the hue, saturation, value data for the image includes generating the feature descriptor based on the hue data and the saturation data for portions of the image that correspond to a bounding box that indicates the object. For example, the video analysis system may generate the feature descriptor based on the hue data and saturation data for a block included entirely within the bounding box and not hue data and not saturation data for other blocks.

The video analysis system determines, for each of two or more tracked objects that each have a historical feature descriptor that includes historical hue data and historical saturation data, a distance between (i) the respective historical feature descriptor that includes the historical hue data and the historical saturation data for the tracked object and (ii) the feature descriptor that includes the hue data and the saturation data for the object (306). For instance, the video analysis system uses an appropriate distance process to determine a first distance between the feature descriptor and a first historical feature descriptor and a second distance between the feature descriptor and a second historical feature descriptor. The first and the second historical feature descriptors are each for one of the two or more tracked objects.

As part of this analysis, the video analysis system need not compare value data for the feature descriptors. For example, in implementations in which the video analysis system does not include value data in a feature descriptor, e.g., when the video analysis system generates the feature descriptor using only hue and saturation data, the video analysis system does not determine a distance between two feature vectors using value data.

In some implementations, when the video analysis system generates a feature descriptor using value data, the video analysis system determines the distance using value data. For example, when the video analysis system generates feature descriptors using hue, saturation, and value data, the video analysis system can determine the distance using a combination of hue, saturation, and value data.

In some implementations, determining, for each of two or more tracked objects that each have a historical feature descriptor that includes historical hue data and historical saturation data, a distance between (i) the respective historical feature descriptor that includes the historical hue data and the historical saturation data for the tracked object and (ii) the feature descriptor that includes the hue data and the saturation data for the object includes determining a Euclidean distance between representations of the historical feature descriptor and the feature descriptor. For example, the video analysis system may determine the distance based on $|g''-p''|$ as described above.

In some implementations, determining a Euclidean distance between representations of the historical feature descriptor and the feature descriptor includes determining a projection of the feature descriptor, determining a projection of the historical feature descriptor, and determining the Euclidean distance based on the projection of the feature descriptor and the projection of the historical feature descriptor. For example, the video analysis system may determine $g''$, $p''$, and then $|g''-p''|$ as described above.

In some implementations, determining a projection of the feature descriptor includes determining a decomposition of a Mahalanobis distance kernel and determining the projection of the feature descriptor based on the feature descriptor and the decomposition of the Mahalanobis distance kernel. For example, the video analysis system may determine D and then determine $g''$ as $g \times D$ as described above.

The video analysis system associates the feature descriptor for the object with a tracked object from the two or more tracked objects whose distance between the respective historical feature descriptor and the feature descriptor satisfies a threshold distance (308). For instance, the video analysis system can determine a tracked object for which the corresponding distance is less than, equal to, or either, the threshold distance. In some examples, the video analysis system can determine a tracked object for which the corresponding distance is less than the other distances. In these examples, the threshold distance is based on the other distances, e.g., indicates that the video analysis system should associate the feature descriptor with the tracked object that has the smallest distance.

The video analysis system tracks the tracked object in one or more images from a video sequence using the feature descriptor and the historical feature descriptor (310). For example, when the video analysis system analyzes data for multiple images in a video sequence, the video analysis system can use the feature descriptor to track the tracked object in one or more images captured after the image.

The order of steps in the process 300 described above is illustrative only, and using feature descriptors to track objects depicted in images can be performed in different orders. For example, the video analysis system can associate the feature descriptor with a tracked object substantially concurrently with tracking the tracked object in one or more images using the feature descriptor.

In some implementations, the process 300 can include additional steps, fewer steps, or some of the steps can be divided into multiple steps. For example, the video analysis system can perform one or more steps described above with reference to FIGS. 1 and 2 to generate the feature descriptor. The video analysis system can perform one or more steps described above with reference to FIG. 1 to determine the distance between the feature descriptor and a historical feature descriptor, e.g., a feature descriptor already stored in a feature database.

Figure 4:
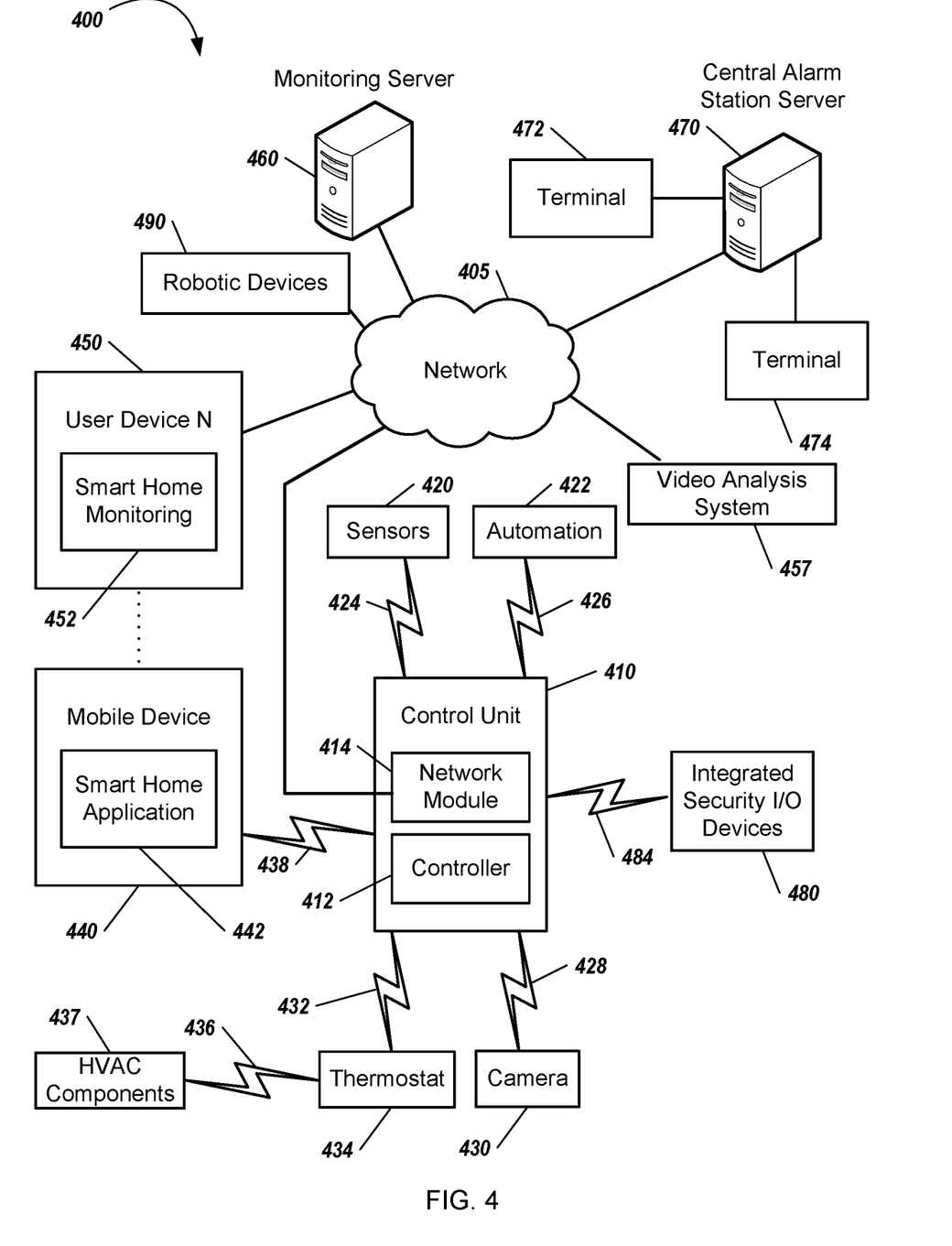
FIG. 4 is a diagram illustrating an example of a home monitoring system.

FIG. 4 is a diagram illustrating an example of a home monitoring system 400. The home monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system 400 may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data. The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. Also, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area or video images of the area in which multiple images of the area are captured at a relatively high frequency (e.g., thirty images per second) or both. The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries, e.g., if located remotely from the control unit 410. The camera 430 may employ a small solar cell to recharge the battery when light is available. The camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

The system 400 includes video analysis system 457. The video analysis system 457 can be computing devices (e.g., a computer, microcontroller, FPGA, ASIC, or other device capable of electronic computation) capable of receiving data related to the video analysis system and communicating electronically with the monitoring system control unit 410.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and also roll along the ground, walls, or ceiling) and land vehicle type devices (e.g., automated cars that drive around a home). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensor that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zig-Bee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the home monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the home monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events (e.g., alarm events) generated by the control unit 410. In this example, the monitoring server 460 may exchange electronic communications with the network module 414 included in the control unit 410 to receive information regarding events (e.g., alerts) detected by the control unit 410. The monitoring server 460 also may receive information regarding events (e.g., alerts) from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system 400 and perform analysis of sensor and image data received from the monitoring system 400. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The central alarm station server 470 is an electronic device configured to provide alarm monitoring service by exchanging communications with the control unit 410, the one or more mobile devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the smart home application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart home application 442. The smart home application 442 refers to a software/firmware program running on the corresponding mobile device that enables the user interface and features described throughout. The user device 440 may load or install the smart home application 442 based on data received over a network or data received from local media. The smart home application 442 runs on mobile devices platforms, such as iPhone, iPod touch, Blackberry, Google Android, Windows Mobile, etc. The smart home application 442 enables the user device 440 to receive and process image and sensor data from the monitoring system.

The user device 450 may be a general-purpose computer (e.g., a desktop personal computer, a workstation, or a laptop computer) that is configured to communicate with the monitoring server 460 and/or the control unit 410 over the network 405. The user device 450 may be configured to display a smart home user interface 452 that is generated by the user device 450 or generated by the monitoring server 460. For example, the user device 450 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, ZigBee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, the robotic devices 490, and the video analysis system 457. The one or more user devices 440 and 450 receive data directly from the sensors 420, the home automation controls 422, the camera 430, the robotic devices 490, and the video analysis system 457 and sends data directly to the sensors 420, the home automation controls 422, the camera 430, the robotic devices 490, and the video analysis system 457. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, the robotic devices 490, and the video analysis system 457 are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, the robotic devices 490, and the video analysis system 457 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, the robotic devices 490, and the video analysis system 457 to a pathway over network 405 when the one or more user devices 440 and 450 are farther from the sensors 420, the home automation controls 422, the camera 430, the thermostat 434, the robotic devices 490, and the video analysis system 457. In some examples, the system leverages GPS information from the one or more user devices 440 and 450 to determine whether the one or more user devices 440 and 450 are close enough to the sensors 420, the home automation controls 422, the camera 430, the thermostat 434, the robotic devices 490, and the video analysis system 457 to use the direct local pathway or whether the one or more user devices 440 and 450 are far enough from the sensors 420, the home automation controls 422, the camera 430, the thermostat 434, the robotic devices 490, and the video analysis system 457 that the pathway over network 405 is required. In other examples, the system leverages status communications (e.g., pinging) between the one or more user devices 440 and 450 and the sensors 420, the home automation controls 422, the camera 430, the thermostat 434, the robotic devices 490, and the video analysis system 457 to determine whether communication using the direct local pathway is possible. If communication using the direct local pathway is possible, the one or more user devices 440 and 450 communicate with the sensors 420, the home automation controls 422, the camera 430, the thermostat 434, the robotic devices 490, and the video analysis system 457 using the direct local pathway. If communication using the direct local pathway is not possible, the one or more user devices 440 and 450 communicate with the sensors 420, the home automation controls 422, the camera 430, the thermostat 434, the robotic devices 490, and the video analysis system 457 using the pathway over network 405.

In some implementations, the system 400 provides end users with access to images captured by the camera 430 to aid in decision-making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system 400 and other events sensed by the monitoring system 400 may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
receiving hue, saturation, value data for an image and data that indicates an object detected in the image;
generating, for the object, a feature descriptor of the object that includes hue data and saturation data from the hue, saturation, value data for the image, wherein generating the feature descriptor comprises:
determining a bounding box that surrounds the object detected in the image,
determining multiple horizontal image strips for the bounding box, each horizontal image strip including two or more blocks included in the bounding box, each block having the same size as other blocks in the two or more blocks,
generating a feature vector for each horizontal image strip by combining data for the two or more blocks in the horizontal image strip, and
generating the feature descriptor of the object using the feature vector for each horizontal image strip;
determining, for each of two or more tracked objects that each have a historical feature descriptor that includes historical hue data and historical saturation data, a distance between (i) the respective historical feature descriptor that includes the historical hue data and the historical saturation data for the tracked object and (ii) the feature descriptor that includes the hue data and the saturation data for the object;
associating the feature descriptor for the object with a tracked object from the two or more tracked objects whose distance between the respective historical feature descriptor and the feature descriptor satisfies a threshold distance; and
tracking the tracked object in one or more images from a video sequence using the feature descriptor and the historical feature descriptor.

2. The method of claim 1, wherein generating, for the object, a feature descriptor that includes hue data and saturation data from the hue, saturation, value data for the image comprises:
 storing, in the feature descriptor, a representation of the hue data and a representation of the saturation data without storing a representation of the value data in the feature descriptor.

3. The method of claim 1, wherein generating, for the object, a feature descriptor that includes hue data and saturation data from the hue, saturation, value data for the image comprises:
 generating the feature descriptor based on the hue data and the saturation data for portions of the image that correspond to a bounding box that indicates the object.

4. The method of claim 1, wherein the value data reflects brightness.

5. The method of claim 1, wherein determining, for each of two or more tracked objects that each have a historical feature descriptor that includes historical hue data and historical saturation data, a distance between (i) the respective historical feature descriptor that includes the historical hue data and the historical saturation data for the tracked object and (ii) the
 feature descriptor that includes the hue data and the saturation data for the object comprises:
  determining a Euclidean distance between representations of the historical feature descriptor and the feature descriptor.

6. The method of claim 1, wherein determining a Euclidean distance between representations of the historical feature descriptor and the feature descriptor comprises:
 determining a projection of the feature descriptor;
 determining a projection of the historical feature descriptor; and
 determining the Euclidean distance based on the projection of the feature descriptor and the projection of the historical feature descriptor.

7. The method of claim 6, wherein determining a projection of the feature descriptor comprises:
 determining a decomposition of a Mahalanobis distance kernel; and
 determining the projection of the feature descriptor based on the feature descriptor and the decomposition of the Mahalanobis distance kernel.

8. The method of claim 6, wherein the projection of the feature descriptor is in a vector space that is smaller than an original vector space of the feature descriptor.

9. The computer-implemented method of claim 1, wherein generating the feature descriptor of the object comprises:
 concatenating the feature vector of each horizontal image strip.

10. A system comprising:
 one or more computers and one or more storage devices storing instructions that are operable, when executed by the one or more computers, to cause the one or more computers to perform operations comprising:
 receiving hue, saturation, value data for an image and data that indicates an object detected in the image;
 generating, for the object, a feature descriptor of the object that includes hue data and saturation data from the hue, saturation, value data for the image, wherein generating the feature descriptor comprises:
  determining a bounding box that surrounds the object detected in the image,
  determining multiple horizontal image strips for the bounding box, each horizontal image strip including two or more blocks included in the bounding box, each block having the same size as other blocks in the two or more blocks,
  generating a feature vector for each horizontal image strip by combining data for the two or more blocks in the horizontal image strip, and
  generating the feature descriptor of the object using the feature vector for each horizontal image strip;
 determining, for each of two or more tracked objects that each have a historical feature descriptor that includes historical hue data and historical saturation data, a distance between (i) the respective historical feature descriptor that includes the historical hue data and the historical saturation data for the tracked object and (ii) the feature descriptor that includes the hue data and the saturation data for the object;
 associating the feature descriptor for the object with a tracked object from the two or more tracked objects whose distance between the respective historical feature descriptor and the feature descriptor satisfies a threshold distance; and
 tracking the tracked object in one or more images from a video sequence using the feature descriptor and the historical feature descriptor.

11. The system of claim 10, wherein generating, for the object, a feature descriptor that includes hue data and saturation data from the hue, saturation, value data for the image comprises:
 storing, in the feature descriptor, a representation of the hue data and a representation of the saturation data without storing a representation of the value data in the feature descriptor.

12. The system of claim 10, wherein generating, for the object, a feature descriptor that includes hue data and saturation data from the hue, saturation, value data for the image comprises:
 generating the feature descriptor based on the hue data and the saturation data for portions of the image that correspond to a bounding box that indicates the object.

13. The system of claim 10, wherein the value data reflects brightness.

14. The system of claim 10, wherein determining, for each of two or more tracked objects that each have a historical feature descriptor that includes historical hue data and historical saturation data, a distance between (i) the respective historical feature descriptor that includes the historical hue data and the historical saturation data for the tracked object and (ii) the feature descriptor that includes the hue data and the saturation data for the object comprises:
 determining a Euclidean distance between representations of the historical feature descriptor and the feature descriptor.

15. The system of claim 10, wherein determining a Euclidean distance between representations of the historical feature descriptor and the feature descriptor comprises:
 determining a projection of the feature descriptor;
 determining a projection of the historical feature descriptor; and
 determining the Euclidean distance based on the projection of the feature descriptor and the projection of the historical feature descriptor.

16. The system of claim 15, wherein determining a projection of the feature descriptor comprises:
 determining a decomposition of a Mahalanobis distance kernel; and determining the projection of the feature descriptor based on the feature descriptor and the decomposition of the Mahalanobis distance kernel.

17. The system of claim 15, wherein the projection of the feature descriptor is in a vector space that is smaller than an original vector space of the feature descriptor.

18. A non-transitory computer-readable medium storing software comprising instructions executable by one or more computers which, upon such execution, cause the one or more computers to perform operations comprising:
- receiving hue, saturation, value data for an image and data that indicates an object detected in the image;
- generating, for the object, a feature descriptor of the object using hue data and saturation data from the hue, saturation, value data for the image and determining to skip using the value data, wherein generating the feature descriptor comprises:
  - determining a bounding box that surrounds the object detected in the image,
  - determining multiple horizontal image strips for the bounding box, each horizontal image strip including two or more blocks included in the bounding box, each block having the same size as other blocks in the two or more blocks,
  - determining a feature vector for each horizontal image strip by combining data for the two or more blocks in the horizontal image strip, and
  - generating the feature descriptor of the object using the feature vector for each horizontal image strip;
- determining, for each of two or more tracked objects that each have a historical feature descriptor that includes historical hue data and historical saturation data, a distance between (i) the respective historical feature descriptor that includes the historical hue data and the historical saturation data for the tracked object and (ii) the feature descriptor that includes the hue data and the saturation data for the object;
- associating the feature descriptor for the object with a tracked object from the two or more tracked objects whose distance between the respective historical feature descriptor and the feature descriptor satisfies a threshold distance; and
- tracking the tracked object in one or more images from a video sequence using the feature descriptor and the historical feature descriptor.

19. The medium of claim 18, wherein generating, for the object, a feature descriptor that includes hue data and saturation data from the hue, saturation, value data for the image comprises:
- generating the feature descriptor based on the hue data and the saturation data for portions of the image that correspond to a bounding box that indicates the object.

20. The medium of claim 18, wherein the value data reflects brightness.

* * * * *